United States Patent [19]

Jacobson

[11] 4,390,752

[45] Jun. 28, 1983

[54] RING DETECTION CIRCUIT FOR A TELEPHONE ANSWERING DEVICE

[76] Inventor: Sava Jacobson, 8130 Orion St., Van Nuys, Calif. 91406

[21] Appl. No.: 211,241

[22] Filed: Nov. 28, 1980

[51] Int. Cl.³ .............................................. H04M 1/64
[52] U.S. Cl. .................................. 179/6.16; 179/84 R
[58] Field of Search ................. 179/84 R, 84 A, 84 L, 179/84 C, 84 T, 2 A, 6.13–6.16

[56] References Cited

U.S. PATENT DOCUMENTS 3,683,122  8/1972  Kalju ................................. 179/84 R
3,896,270  7/1975  Kopec et al. ..................... 179/84 R

FOREIGN PATENT DOCUMENTS 998440   7/1965  United Kingdom .
1056277  1/1967  United Kingdom ............... 179/6.16

Primary Examiner—Raymond F. Cardillo, Jr.
Attorney, Agent, or Firm—Spensley, Horn, Jubas & Lubitz

[57] ABSTRACT

A ring responsive circuit useful with a telephone answering device employs a single low inductance transformer both to couple audio to the telephone line and in the ring responsive circuit. A voltage doubler and neon bulb effectively capacitively couple the transformer primary to the telephone line. When a ring signal occurs, the doubled voltage fires the neon bulb on alternate half cycles of the ring signal. The resultant fast rise time current transients contain high frequency components that are coupled by the same transformer to the secondary. There, they repetitively momentarily turn on a transistor, as a result of which a bistable circuit is latched on. When on, the latch circuit connects dc power to the motor, amplifiers and other circuitry of the telephone answering device, and to the coil of a relay the contacts of which shunt the voltage doubler circuit and directly connect the transformer primary to the telephone line so as to seize the line and begin the answering cycle.

2 Claims, 14 Drawing Figures

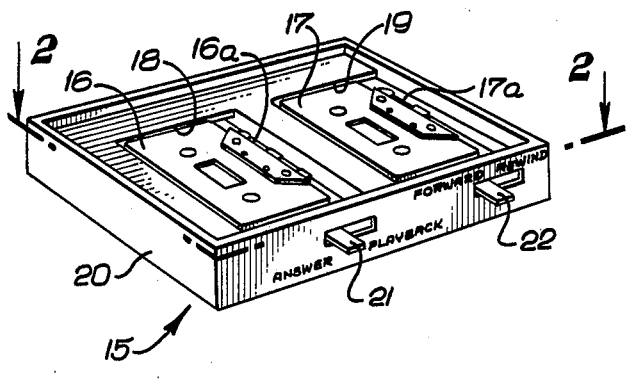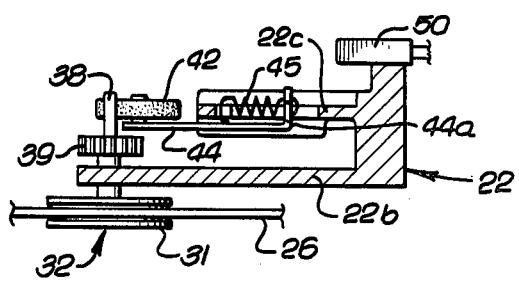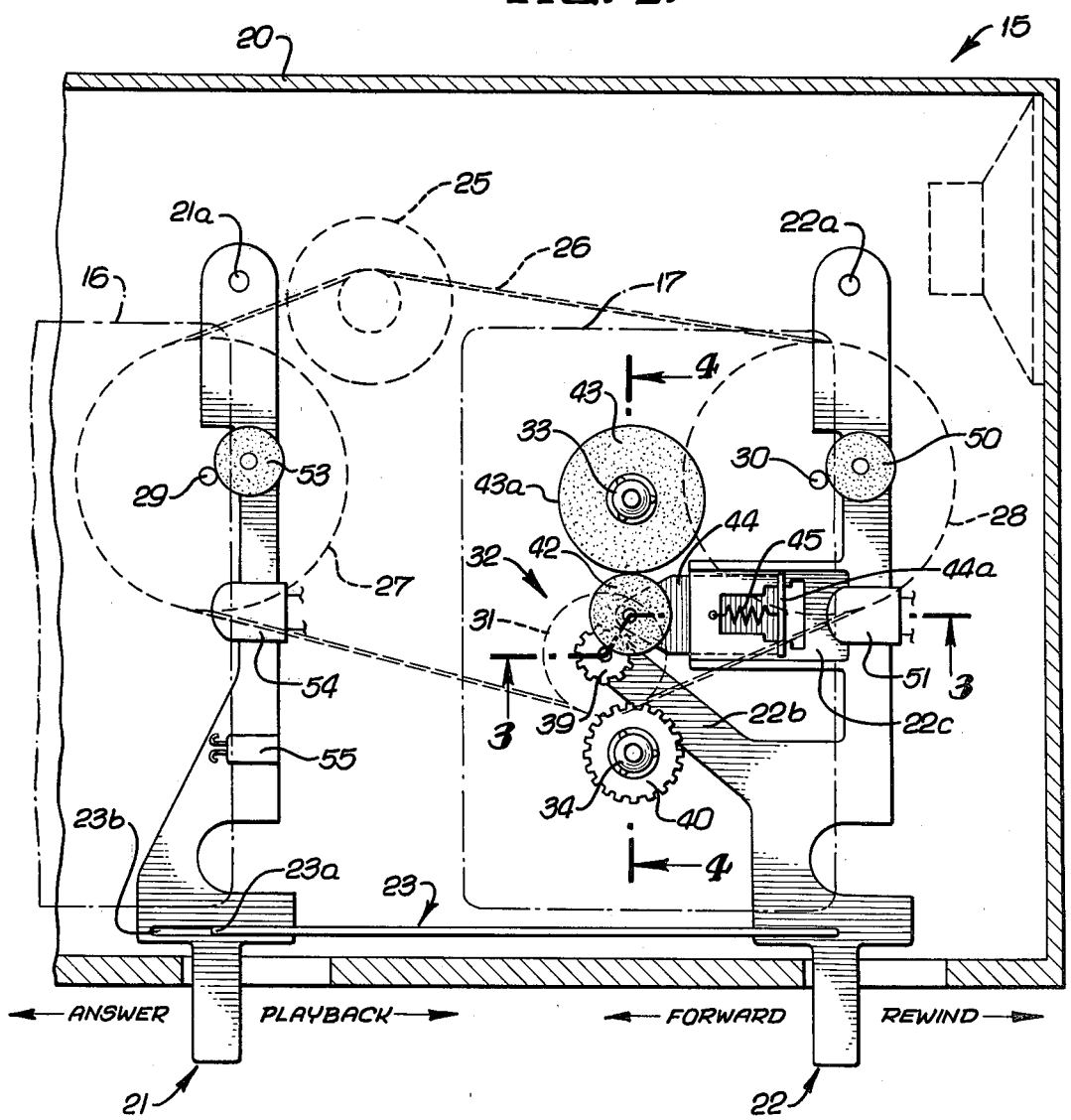

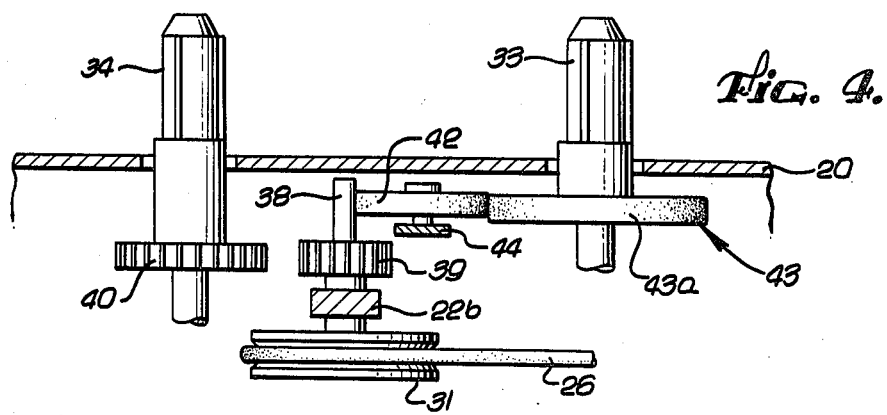
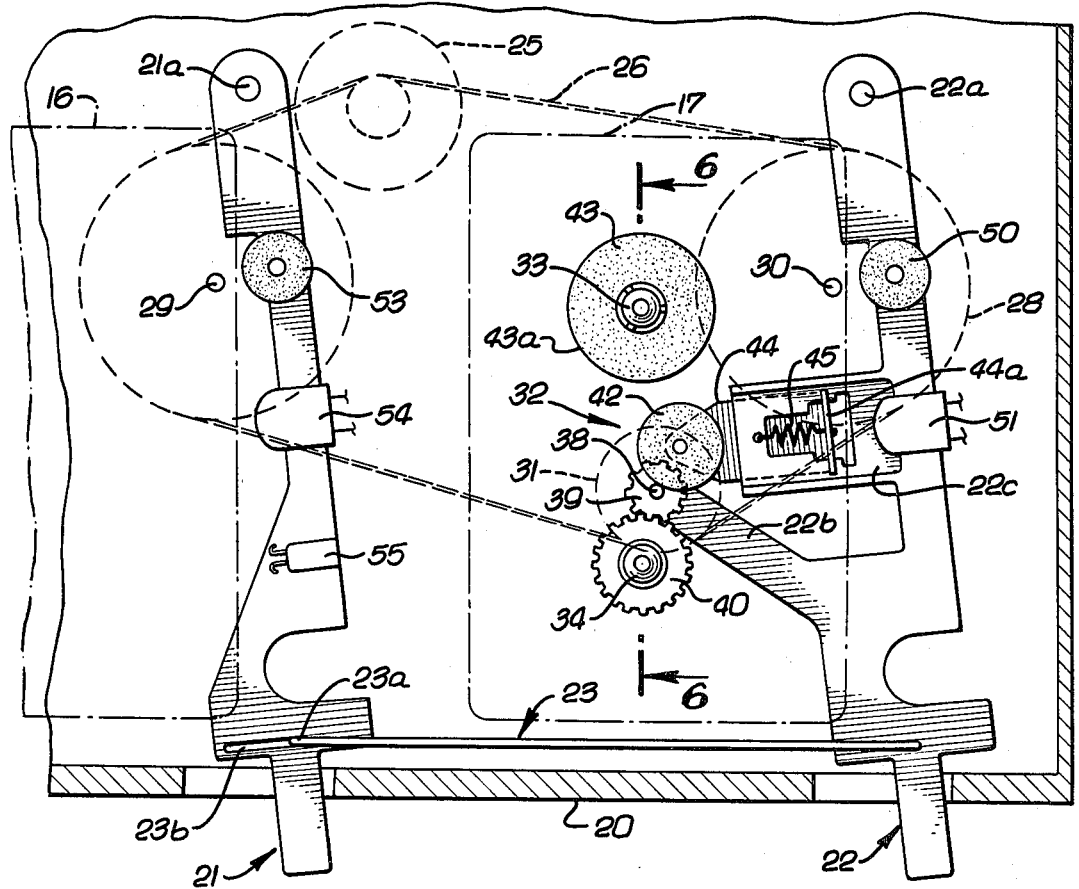
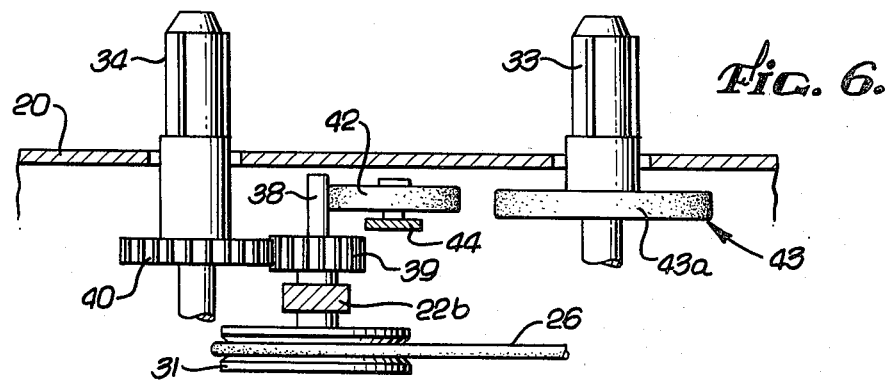

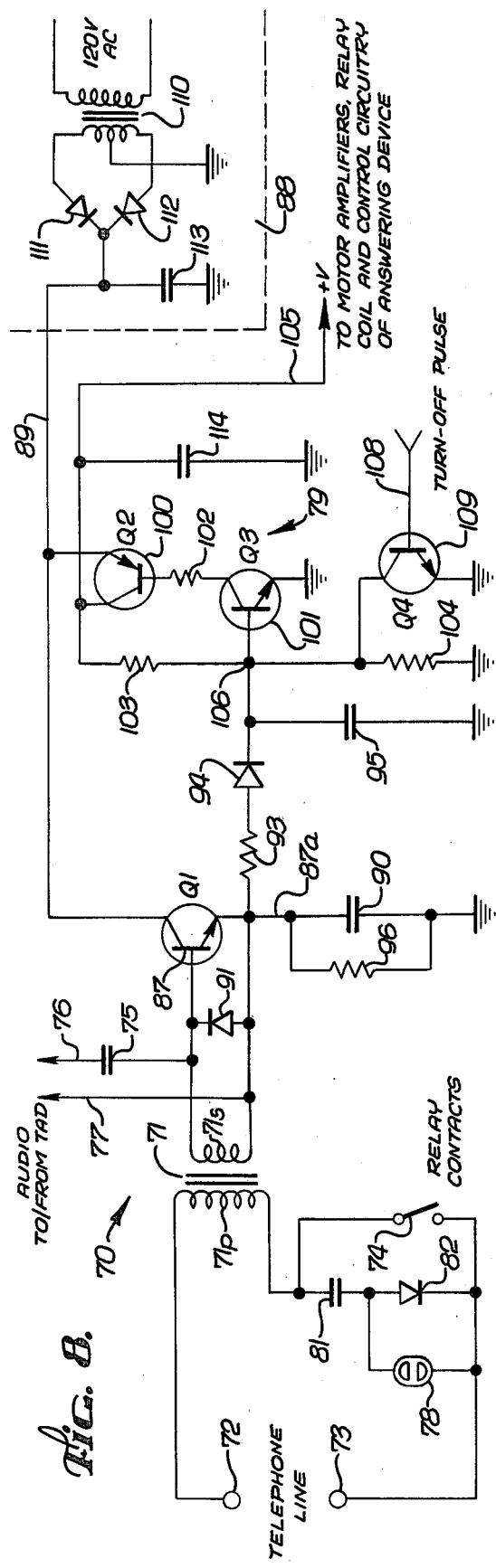
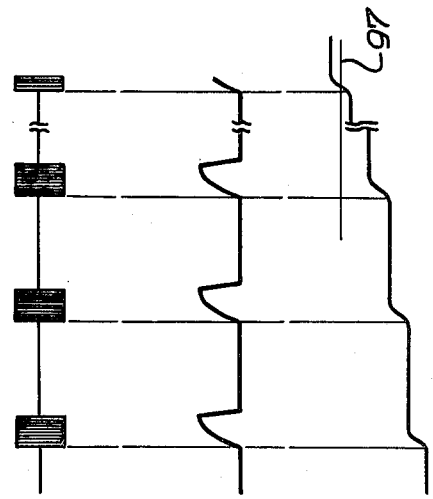
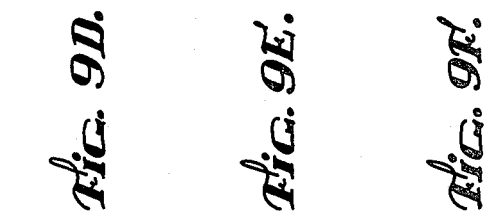
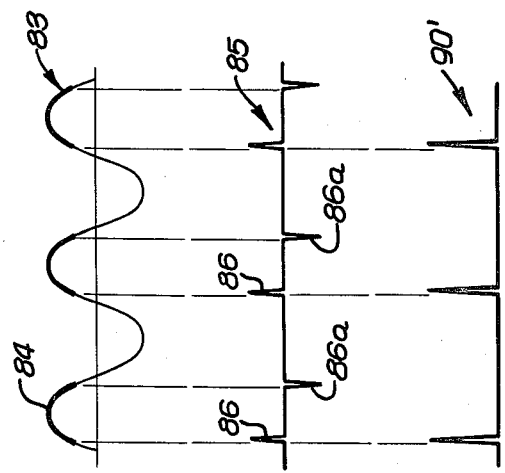

RING DETECTION CIRCUIT FOR A TELEPHONE ANSWERING DEVICE

BACKGROUND OF THE INVENTION

1. Field of the Invention

The present invention relates to a control mechanism for a telephone answering device employing magnetic tape cassettes, and to a ring detection circuit useful with such a device.

2. Description of the Prior Art

Certain characteristics of magnetic tape cassettes make them particularly advantageous for use in a telephone answering device. For the same length of tape, a cassette requires less space than a reel-to-reel arrangement, thereby enabling size reduction of the device without reducing the number of incoming messages that can be recorded. With a cassette, there is no problem of tape accidentally spilling off the reel. Cassettes are easy to handle and replace. If the user should wish to retain the recorded incoming messages, this can be done by simply substituting a new cassette. The outgoing announcement advantageously is recorded on a reentrant loop tape cassette.

Certain mechanical constraints are imposed by the use of tape cassettes. The tape itself is driven by contact between a capstan and a pinch roller. The tape is then wound about a reel or spool within the cassette that is driven by a spindle. The takeup reel spindle must be appropriately rotated so that the tape being driven from the capstan is wound onto the reel under tension and without slack. Thus a drive arrangement is required which both rotates the capstan at a constant rate and which simultaneously rotates the takeup reel spindle in a manner so as to maintain the necessary tape tension. A further requirement in a tape cassette telephone answering device is to provide a rewind capability for the incoming message tape. This includes disengagement of the capstan and driving of the supply reel at a fairly rapid rate.

In the inventor's U.S. Pat. No. 4,118,602 there is a presented a simplified mechanical control arrangement for a telephone answering device employing a reel-to-reel incoming message record tape and a separate outgoing announcement loop. The mechanism employs two control arms connected by a lost motion linkage. The control arms respectively are configured for forward-rewind selection for the incoming message tape, and for answer-playback mode selection. The mechanical arrangement shown therein is well suited for a reel-to-reel tape mechanism with an independent tape loop drive configuration in which the loop is rim driven from the outgoing message takeup reel. Forward-rewind selection is achieved by a tilting a pivotally mounted tape drive motor. However, such mechanical arrangement does not lend itself to use in a tape cassette telephone answering device, owing to the totally different requirements of the cassettes themselves.

Thus it is an objective of the present invention to provide a simplified control mechanism for use in a telephone answering device that employs magnetic tape cassettes. Another objective is to permit the use of a single motor that is fixedly mounted to the answering device chassis to drive both the outgoing announcement tape cassette and the incoming message record tape cassette. A further objective is to provide mechanism for transferring between forward and rewind drive conditions in the message record tape cassette, while retaining the simplicity of the lost motion linked control arms to change the operational mode of the telephone answering device.

Another problem which arises in a tape cassette telephone answering device results from the accessibility to the user of the cassette record/playback heads. For hum prevention, the metal shields of these heads must be electrically connected to the power source ground in the answering device. The telephone line typically carries a 50 volt dc potential, which is considered a hazardous voltage by Underwriters Laboratories. If there were no dc isolation between the telephone line and the power source ground in the answering device, the user might be subject to a 50 volt shock if he should accidently touch grounded metallic components in the answering device, such as the shields of the record/playback heads.

In a reel-to-reel answering device, such as that disclosed in the inventor's U.S. Pat. Nos. 3,780,226 or 3,818,141 or 3,909,537 this is not a problem. The reason is that the entire reel-to-reel unit can be enclosed in a plastic case, so that the user can never touch the metallic components. In such an answering device, it is acceptable to have a dc path between the telephone line and the unit ground. The user is protected from shock by the insulating plastic houing. However, in a cassette telephone answering device, in which the shields of the record/playback heads are exposed and connected to ground, to avoid the risk of shock, it is necessary to have complete dc isolation of the telephone line from the device power source. Such isolation can be achieved by using ac coupling for the ring detection circuitry and using the contacts of a relay that is closed in response to ring detection to connect a transformer primary directly across the telephone line to accomplish line seizure.

An objective of the present invention is to implement such arrangement in a low-cost telephone answering device in which a single transformer is used both to couple audio to and from the telephone line, and as a coupling device for ring detection.

The problem involved with such dual usage of a single transformer is the following. Audio can be efficiently coupled using a very inexpensive transformer of low inductance. Prior to line seizure, the transformer primary must be coupled to the telephone line by a capacitor which, by typical telephone company standards, can be no larger than one microfarad. If the transformer has a typical low inductance value of 0.3 Henry, its low frequency coupling capability will be very poor. A ring signal, which may consist of a sine wave at 20 Hz, will effectively not be coupled at all into the transformer secondary. Normally this means that the low-cost audio transformer cannot also be used in the ring detection circuit. An objective of the present invention, however, is to provide a circuit which permits such a single low-cost, low inductance audio transformer to be used for the dual purpose of both audio coupling and ring detection. The circuit insures dc isolation between the telephone line and the device power supply ground, and permits use of a relay to connect the transformer primary directly to the telephone line to accomplish line seizure at the beginning of the answering cycle.

In these regards, the present circuit is different from the ring responsive circuit disclosed in the inventor's U.S. Pat. No. 3,909,537. That circuit does not use a line seizure relay, but accomplishes telephone line seizure through a dc path which is common to the dc return or ground of the telephone answering device. As discussed above, this is satisfactory in a reel-to-reel device that can be protectively enclosed in a plastic housing, but is not acceptable in a tape cassette unit in which, while changing the cassettes, the user has access to grounded metallic parts. The present circuit also is different in that although the patented system uses a transformer in the ring detection circuit, audio is not coupled via this transformer. Rather, audio is coupled directly from the telephone line which is seized with a separate inductive load. The present invention allows dual use of the transformer, with telephone line coupling that is dc isolated from the answering device circuitry.

SUMMARY OF THE INVENTION

These and other objectives are achieved in a telephone answering device by arranging the cassettes side-by-side and utilizing a single drive motor fixedly mounted to the chassis to drive both the outgoing announcement and the incoming message record magnetic tape cassettes. A pair of pivotable control arms are situated adjacent the respective open, tape-exposed sides of the cassettes, the arms being connected by a lost motion linkage. The control arm associated with the incoming message record tape cassette serves to select forward or rewind operation through the use of a drive transfer assembly which is belt-coupled to the motor.

In one embodiment, the drive transfer assembly is carried by the forward-rewind control arm itself. A shaft and pulley are journalled to an integral extension of the control arm. The motor drive belt engages the pulley. When the contol arm is in the rewind position, a gear on the shaft engages a gear on the cassette supply reel spindle so as to communicate rotational motion directly to the spindle. The drive transfer assembly also includes an idler wheel that is biased into contact with the shaft. When the control arm is placed in the forward direction, this idler wheel communicates rotation from the shaft of the rim of a conventional clutch associated with the takeup reel spindle of the incoming message tape cassette.

In an alternative embodiment, the drive transfer assembly is movably supported by the chassis itself. The support is linked to the control arm so as to move the assembly between the forward and reverse positions when the control arm is pivoted.

Each of the control arms also carries a pinch roller which engages the respective tape drive capstan, and a record-playback head that engages the respective cassette tape. The announcement tape may be used for answering cycle timing purposes, and to this end may be provided with an electrically conductive strip. In such instance, a strip engaging contact post is provided on the answer-playback control arm, which operatively engages the outgoing announcement tape when that arm is in the answer position.

The inventive ring responsive circuit is implemented by capacitively coupling to the telephone line the primary of a low-cost, low inductance transformer. The coupling capacitor is utilized as a component of a voltage doubler circuit including a neon bulb. The low frequency ring signal itself is not coupled by the audio transformer. However, during a portion of alternate half-cycles of the ring signal, the voltage doubler establishes sufficient voltage to turn on the neon bulb. Such turn-on is accompanied by very fast rise time current transients which include high frequency components that are coupled by the transformer. The coupled transients are used to repetitively, momentarily switch on a transistor that delivers power from a source to a capacitor. As a result, this capacitor is charged to a certain level during each ring.

The charge on this capacitor is transferred to another, larger valued capacitor, the net charge of which thereby increases as each ring occurs. After a certain number of rings, the charge on the other capacitor will exceed the threshold value of a bistable latch circuit. The latch circuit then will change state, thereby connecting power from the source to other answering device circuits, to the motor which drives the tape cassettes, and to the coil of a relay, the contacts of which are shunted across the neon bulb and voltage doubler circuit. Closure of these contacts will connect the transformer primary directly to the telephone line, thereby seizing the line. The device is now conditioned to answer the call. Audio is coupled to and from the line via the same transformer. At the end of the answering cycle, in a manner known per se, the bistable circuit is unlatched, thereby disconnecting dc power from the answering device and relay coil. The relay contacts open to return the answering device to the standby condition.

BRIEF DESCRIPTION OF THE DRAWINGS

A detailed description of the invention will be made with reference to the accompanying drawings wherein like numerals designate corresponding elements in the several figures.

FIG. 1 is a pictorial view of the inventive telephone answering device utilizing magnetic tape cassettes.

FIG. 2 is a transverse sectional view along the line 2—2 of FIG. 1 showing the control mechanism with the control arms respectively in the answer and forward positions.

FIGS. 3 and 4 respectively are transverse sectional views along the lines 3—3 and 4—4 of FIG. 2 showing the drive transfer assembly means positioned to drive the incoming message tape cassette in the forward direction.

FIG. 5 is a transverse sectional view along the same line as FIG. 2, but showing the control arms respectively situated in the rewind and playback positions.

FIG. 6 is a transverse sectional view along the line 6—6 of FIG. 5 showing the drive transfer assembly means in the rewind position.

FIG. 8 is an electrical schematic diagram of a ring detection circuit in accordance with the present invention.

FIGS. 9A through 9F show waveforms illustrating the operation of the ring detection circuit of FIG. 8.

DESCRIPTION OF THE PREFERRED EMBODIMENTS

Figure 7:
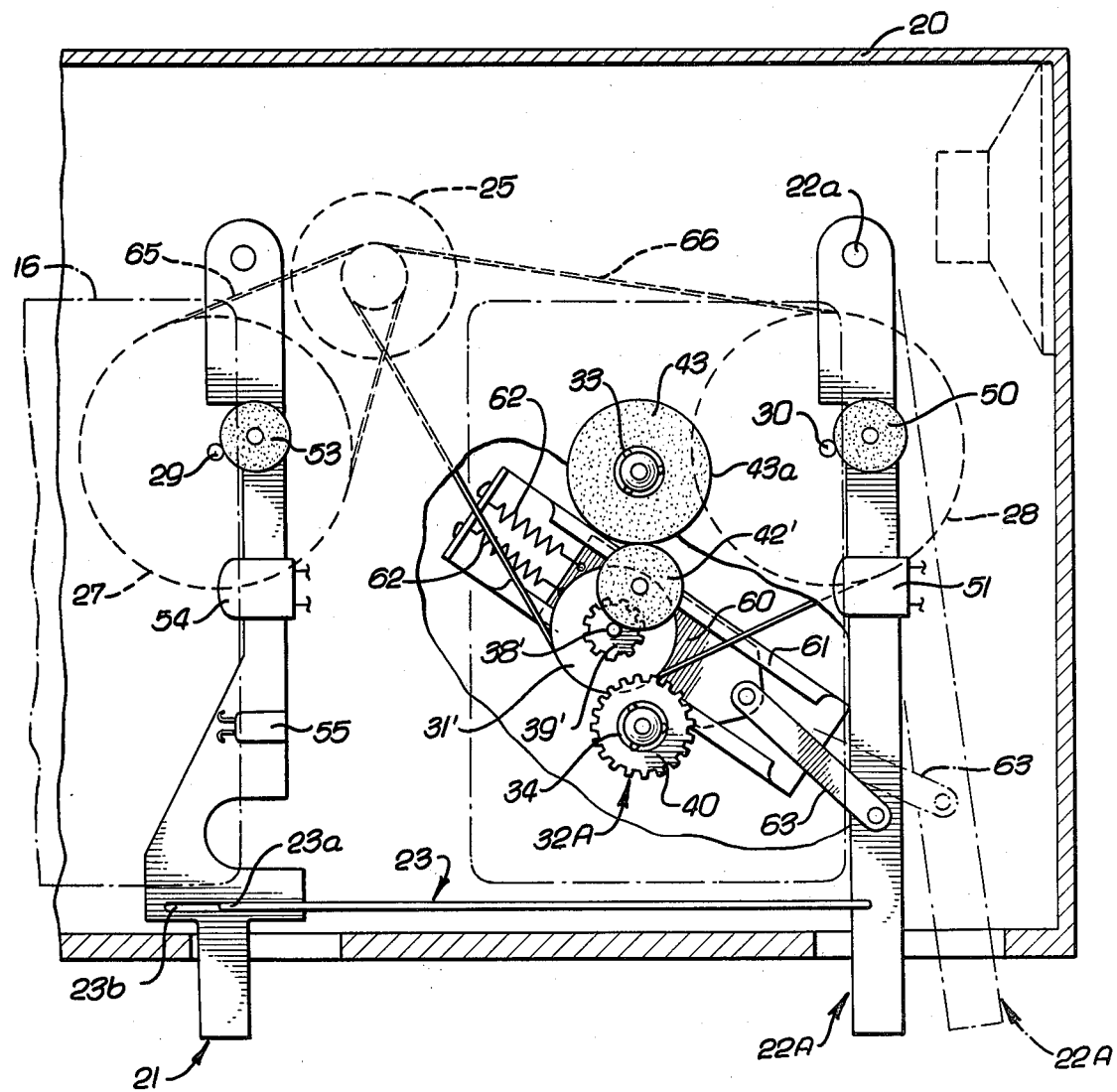
FIG. 7 is a transverse sectional view like FIG. 2 but showing an alternative embodiment in which the drive transfer assembly is not directly carried by the control arm.

The following detailed description is of the best presently contemplated modes of carrying out the invention. This description is not to be taken in a limiting sense, but is made merely for the purpose of illustrating the general principles of the invention since the scope of the invention best is defined by the appended claims. Operational characteristics attributed to forms of the invention first described also shall be attributed to forms later described, unless such characteristics obviously are inapplicable or unless specific exception is made.

The inventive telephone answering device 15 (FIG. 1) advantageously employs a reentrant loop magnetic tape cassette 16 on which an outgoing announcement is recorded, and another magnetic tape cassette 17 onto which incoming messages are recorded. The manner in which the device 15 automatically answers a telephone call may be like that disclosed in the inventor's U.S. Pat. No. 3,780,226 entitled "Telephone Answering Apparatus".

The tape cassettes 16 and 17 are received in respective recesses 18, 19 of a chassis or housing 20. Selection of the operational mode of the device 15 is accomplished by means of an "answer-playback" control arm 21 and a "forward-reverse" control arm 22. These are connected by a lost motion linkage 23 comprising a link 23a one end of which is received in a slot 23b in the control arm 21, as shown in FIGS. 2 and 5. With this arrangement, when the control arm 21 is moved to the automatic answer position, the control arm 22 is always urged to the forward position. Conversely, when the arm 22 is moved to the rewind position, the control arm 21 is moved to the playback position. Playback operation is obtained when the control arm 21 is set to the playback position (toward the right as viewed in FIG. 2) while the control arm 22 is set to the forward (i.e., leftward) position.

Referring to FIGS. 1, 2 and 5, the recesses 18, 19 advantageously are arranged so that the cassettes 16 and 17 are received in spaced parallel alignment, with the respective open, tape exposed sides 16a, 17a facing the respective control arms 21, 22. The control arms 21, 22 are pivotally mounted to the chassis by respective pivots 21a, 22a in alignment with the cassette sides 16a, 17a. Thus when in the answer and forward positions respectively, the control arms 21, 22 themselves are in spaced parallel alignment.

A single motor 25, fixedly mounted to the chassis 20, is used to drive both of the cassettes 16 and 17 via a resilient belt 26. The belt 26 loops around the drive flywheels 27, 28 of the respective capstans 29, 30 for the outgoing announcement cassette 16 and the incoming message cassette 17. The belt 26 also engages the pulley 31 of a drive transfer assembly 32 that communicates rotational driving force either to the spindle 33 of the takeup reel in the cassette 17 (in the forward position shown in FIGS. 2, 3 and 4) or to the source reel spindle 34 (in the rewind position shown in FIGS. 5 and 6).

In the embodiment of FIGS. 2 through 6 the drive transfer assembly 32 is completely carried by the control arm 22. The arm 22 has a horizontal extension 22b to which is journalled a vertical shaft 38 that carries the pulley 31. Also fixed to the shaft 38 is a gear 39 which, when the control arm 22 is in the rewind position (FIGS. 5 and 6), engages a gear 40 connected to the source reel spindle 34. With this arrangement, rotational motion is communicated from the motor 25 to the source reel spindle 34 via the belt 25, the pulley 31, the shaft 38 and the gears 39, 40 to accomplish rewind.

The drive transfer assembly 32 also includes an idler wheel 42 which, in the forward position of the control arm 22 (FIGS. 2 and 4) communicates rotational motion from the shaft 38 to the rim 43a of a conventional slip clutch 43 associated with the takeup reel spindle 33. Use of the idler 42, which may comprise a rubber wheel, achieves a reversal of rotational direction, so that the takeup reel spindle 33 is driven in the correct forward direction without reversing the rotation of the motor 25.

The idler 42 is carried by a horizontal bracket 44 that is mounted on a projection 22c of the control arm 22. The bracket 44 and idler 42 can move between limits with respect to the projection 22c. A spring 45 connects a vertical shoulder 44a on the bracket 44 to the projection 22c and biases the idler into positive contact with the shaft 38 and the rim 43a. With this arrangement, as shown in FIG. 2, the motor 25 provides appropriate driving force for the takeup reel spindle 33.

The control arm 22 also carries a pinch roller 50 situated to press the tape in the cassette 17 against the capstan 30 when in the forward position shown in FIG. 2. The relative diameters of the pulley 31, the shaft 38, the idler 42 and the rim 43a are selected so that rotation of the takeup spindle 33 acts to maintain tension on the tap as it emerges past the capstan 30. The clutch 43 compensates for different radii of the tape wound onto the takeup reel, thereby ensuring correct takeup of slack. The control arm 22 also carries a conventional record/playback head 51 which engages the tape in the cassette 17 when in the forward position shown in FIG. 2.

The control arm 21 also carries a pinch roller 53 which urges the tape in the cassette 16 against the drive capstan 29 when in the answer position. By using a reentrant tape loop, there is no need for drive spindles for the cassette 16, hence none are shown in the drawings. The control arm 21 also carries a record/playback head 54 that picks up the outgoing announcement from the tape in the cassette 16. The reentrant tape loop may be used to time the answering cycle, or to actuate midcycle mode switching from announcement transmission to incoming message recording. For these functions, a conductive strip may be provided on the tape loop. Correspondingly, two or more electrical contacts may be provided on a post 55 that is carried on the control arm 21. When the conductive strip touches the contacts, an electrical circuit is completed that actuates the midcycle mode shift or ends the answering cycle in a manner known per se. In addition, movement of the control arm 21 to the playback position may actuate a switch (not shown) which applies power to the motor 25 so as to drive the cassette 17 during rewind and playback of the previously recorded incoming messages.

In the alternative embodiment of FIG. 7, the drive transfer assembly 32A itself is not carried by the control arm 22A, but is actuated thereby. The assembly 32A is mounted on a support 60 that slides in a track 61 attached to the chassis 20. The support 60 carries a pulley 31', a shaft 38' and a gear 39' and a biased idler wheel 42' which correspond to the like-numbered but unprimed components in the embodiment of FIG. 2. The support 60 itself is biased to the forward position shown in FIG. 7 by a spring 62. When the control arm 22A is moved to the rewind position shown in phantom, a linkage 63 pulls the support 60 to a position in which the idler wheel 42' is disengaged from the rim 43a and in which the gear 39' engages the gear 40 so as to rewind the tape.

In the embodiment of FIG. 7 separate belts 65, 66 are used between the motor 25 and the flywheels 27 and 28 respectively. The belt 66 engages the pulley 31' of the assembly 32A. Of course, a single belt (like the belt 26 of FIG. 2) could be used instead.

The inventive ring responsive circuit 70 useful in a cassette telephone answering device is shown in FIG. 8.

A low cost audio transformer 71 is connected across the telephone line terminals 72, 73 in series with the normally-open contacts 74 of a line seizure relay. These relay contacts 74 are closed in response to ring detection by the circuit 70, thereby directly connecting the primary 71p of the transformer 71 as a load across the telephone line. This simulates the "off-hook" condition, in which the telephone line is seized. Thereafter, audio signals can be coupled to or from the telephone line via the transformer 71, the secondary 71s of which is connected to the answering device audio circuits via a capacitor 75 and the lines 76 and 77. Alternatively, the transformer 71 may have an additional secondary winding (not shown) via which speech is coupled to or from the audio circuits.

For low cost, the transformer 71 typically has a relatively low inductance on the order of 0.3 Henry. Prior to line seizure, the transformer primary 71p cannot be connected directly to the telephone line. If used for ring detection, the primary 71p must be capacitively coupled to the line with a maximum capacitance specified by the telephone company, typically not more than 1 mfd. With a 1 mfd coupling capacitor and a transformer 71 of 0.3 Henry inductance, there will be very little energy transfer or coupling of a low frequency (typically 20 Hz) ring signal into the secondary 71s. The ring signal will be so attenuated that the transformer 71 output will be insufficient for ring detection.

This problem is overcome in the present circuit by the use of a neon bulb 78 connected to the transformer primary 71p in such a manner as to create, in response to a ring signal, transients having high frequency components. These are effectively coupled by the transformer 71 and thereafter used to cause latching of a bistalbe circuit 79 that turns on power to the answering device circuitry. To this end, a capacitor 81 and a diode 82 are connected across the relay contacts 74 so that prior to telephone line seizure, the transformer primary 71p is capacitively coupled to the telephone line via these components 81, 82. The neon bulb 78 is connected across the diode 82.

When a sine wave ring signal 83 (FIG. 9A) occurs, during alternate half cycles current flows through the diode 82, thereby charging the capacitor 81. Since there is forward conduction through the diode 82, the neon bulb 78 does not fire. During the other half cycles, the voltage across the neon bulb 78 is equivalent to the sum of the charge on the capacitor 81 plus the voltage of the ring signal itself. For a portion of these half cycles, indicated by the heavy lines 84 in FIG. 9A, the sum voltage exceeds the breakdown voltage of the neon bulb 78, causing that bulb to go on. In effect, the capacitor 81 and diode 82 function as a voltage doubler to produce the requisite neon bulb turn-on voltage. A voltage doubler may not be required if the peak voltage of the ring signal is sufficient itself to turn on the neon bulb for a portion of each cycle.

At each instant when the bulb 78 turns on and turns off, a corresponding fast rise time transient occurs in the current path through the transformer primary 71p. These current transients, represented by the waveform 85 of FIG. 9B, contain high frequency components which are efficiently coupled by the transformer 71 to the secondary 71s. There, each positive going transient 86 momentarily turns on a transistor 87 the base and emitter of which are connected across the transformer secondary 71s. When the transistor 87 goes on, voltage from a source 88 is supplied via a line 89, the collector-to-emitter path of the transistor 87 and a line 87a to a capacitor 90. Successive transients 86 cause corresponding successive bursts of voltage 90' (FIG. 9C) to be applied to the capacitor 90, thereby gradually charging the capacitor 90 toward the source voltage level $+V$, as indicated by the waveform of FIG. 9E. The negative going transients 86a which are coupled by the transformer 71 do not turn on the transistor 87. A diode 91 prevents these transients from adversely damaging the transistor 87.

During the course of each ring signal (FIG. 9D) the capacitor 90 is charged toward the voltage level $+V$. This charge then is coupled via a resistor 93 and a diode 94 to a capacitor 95 of larger value than the capacitor 90. In the interim between consecutive ring signals, the capacitor 90 is substantially discharged through a large shunt resistance 96. However, the capacitor 95 is not then discharged, since the discharge path is blocked by the diode 94.

This operation is repeated during successive rings (FIG. 9D) with the charge on the capacitor 95 increasing at every ring signal, as shown in FIG. 9F. After a sufficient number of ring signals have occurred, the charge across the capacitor 95 reaches a threshold level 97 (FIG. 2F) at which time the bistable latch 79 switches to the on state. The number of rings required to charge the capacitor 95 to this threshold level thus establishes the delay time with which the device "answers" the call. The values of the resistor 93 and the capacitor 95 advantageously are selected so that a call will be answered after say, two, three or four rings.

The latch circuit 79 consists of a pair of transistors 100, 101 interconnected by a set of resistors 102, 103 and 104. Initially, both of the transistors 100 and 101 are off. In this condition, no voltage from the source 88 is supplied from the $+V$ line 89 via the transistor 100 to a line 105. After turn-on, power is supplied to the motor, amplifiers and other circuitry of the telephone answering device via this line 105. Since the transistor 100 initially is off, there is no voltage across the divider consisting of the resistors 103 and 104. Therefore no voltage is supplied from the junction 106 of these resistors to the base of the transistor 101, so that initially the transistor 101 is off.

The capacitor 95 is connected to the node 106. Thus when a ring signal occurs, the charge across the capacitor 95 (FIG. 9F) is applied to the base of the transistor 101. When this voltage reaches the threshold level 97, the transistor 101 begins to conduct. Current flows in the path from the source 88 via the line 89, the emitter-to-base path of the transistor 100, the resistor 102 and the collector-to-emitter path of the transistor 101 to ground. The resultant positive voltage at the base of the transistor 100 begins to turn on this transistor. As the transistor 100 starts to conduct, current flows in the path from the source line 89 via the emitter-to-collector path of the transistor 100 and the resistors 103, 104 to ground. As a result, the voltage at the junction 106 begins to rise, thereby causing increased conduction of the transistor 101. The action is regenerative. The increased conduction of the transistor 101 causes further conduction of the transistor 100 and increased current flow through the resistors 103, 104. The result is that the latch 79 very quickly assumes its alternate stable state in which the transistors 100 and 101 both are fully conducting. The circuit 79 remains latched in this "on" condition even after the ring signal terminates, since the transistor 101 is held on by the continued bias developed across the resistors 103, 104.

When the circuit 79 is latched on, +V voltage from the source 88 is supplied from the line 89 via the fully conducting transistor 100 to the line 105. That is, power now is supplied to the motor, amplifiers and other circuitry of the telephone answering device. Voltage also is supplied from the line 105 either directly or via appropriate triggering circuitry to the coil of the line seizure relay. The resultant current flow through the relay coil causes the relay contacts 74 to close, thereby seizing the telephone line by directly connecting the transformer primary 71p to the terminals 72, 73. In this manner, the ring detector circuit 70 responds to a ring signal and causes seizure of the telephone line and supply of voltage to the answering device motor, amplifiers and logic circuits. This enables answering of the incoming call.

At the end of the answering cycle, in a manner known per se, an appropriate timing device or other circuit supplies a turn-off pulse on a line 108. This pulse momentarily turns on a transistor 109 which shorts to ground the node 106 at the base of the transistor 101. As a result, conduction of the transistor 101 ceases, which also turns off the transistor 100 and causes the latch circuit 79 to reset to the quiescent condition in which both transistors 100 and 101 are off and no power is supplied to the line 105. Termination of voltage to the line 105 turns off the answering device circuitry and thereby de-energizes the seizure relay coil, causing the relay contacts 74 to open. This releases the telephone line and returns the answering device to the "on-hook" state, in readiness to answer the next call.

Although not so limited, the power source 88 may consist of a power transformer 110 connected across a supply of AC voltage. The center tapped secondary of the transformer 110 is connected via a pair of diodes 111, 112 to the line 89. A filter capacitor 113 filters the +V voltage from the source 88, and another filter capacitor 114 filters the voltage supplied to the answering device components via the line 105.

I claim:

1. For use in a tape cassette or like telephone answering device in which metallic components that are electrically connected to the device electrical ground are accessible to the user, thereby requiring dc isolation of the telephone line from the device power source and electrical ground, a ring responsive circuit comprising:

a relay having a coil and a set of contacts, an audio transformer having a primary and a secondary, the primary being connected in series with said relay contacts across the telephone line, said transformer being able to couple audio from the telephone line, a neon bulb and circuit connected in parallel with said relay contacts so as to capacitively connect the transformer primary across the telephone line when said relay contacts are open, said neon bulb turning on for a portion of each cycle of the ring signal, conduction of said neon bulb resulting in the production of fast rise time transients having high frequency components which are effectively coupled by said transformer, a source of power, a transistor, a first capacitor connected to be charged from said source of power via said transistor, the secondary of said transformer being effectively connected to the base of said transistor so that the coupled high frequency components momentarily turn on said transistor so as to cause concomitant charging of said first capacitor from said power source, and bistable switching means, latched in response to the charging of said first capacitor, for connecting said source of power to electrical components of said telephone answering device, including said relay coil, the resultant closure of said relay contacts directly connecting said transformer primary to the telephone line to seize the same, audio thereafter being coupled between said telephone line and said answering device via said transformer.

2. A ring responsive circuit according to claim 1 wherein said transformer has low inductance and substantially attenuates or is unable to couple a low frequency ring signal, and wherein said circuit is a voltage doubler, said neon bulb turning on for a portion of each cycle of the ring signal as a result of doubled voltage occurring during that portion.

* * * * *